(12) United States Patent
Christensen et al.

(10) Patent No.: US 7,824,537 B2
(45) Date of Patent: Nov. 2, 2010

(54) ELECTROCHEMICAL DEVICE

(75) Inventors: Paul Andrew Christensen, Morpeth (GB); Nicholas George Wright, Gosforth (GB); Terrence Arthur Egerton, Stockton on Tees (GB)

(73) Assignee: Gen-X Power Corp, Rarotonga (CK)

( * ) Notice: Subject to any disclaimer, the term of this patent is extended or adjusted under 35 U.S.C. 154(b) by 911 days.

(21) Appl. No.: 11/661,328

(22) PCT Filed: Sep. 2, 2005

(86) PCT No.: PCT/GB2005/003406

§ 371 (c)(1),
(2), (4) Date: Mar. 5, 2007

(87) PCT Pub. No.: WO2006/024869

PCT Pub. Date: Mar. 9, 2006

(65) Prior Publication Data

US 2008/0029384 A1 Feb. 7, 2008

(30) Foreign Application Priority Data

Sep. 3, 2004 (GB) ............................ 0419629.1

(51) Int. Cl.
*C02F 1/46* (2006.01)
(52) U.S. Cl. .................. 205/701; 205/742; 205/759; 204/242; 204/271; 204/290.12
(58) Field of Classification Search ............ 205/701, 205/742, 759; 204/242, 271, 290.12
See application file for complete search history.

(56) References Cited

U.S. PATENT DOCUMENTS 5,395,522 A 3/1995 Melanson et al.

FOREIGN PATENT DOCUMENTS

DE 198 44 329 A1 3/2000
WO WO2004/081536 A2 * 9/2004

OTHER PUBLICATIONS

Butterfield et al. "Water diinfection using an immobilised titanium dioxde film in a photochemical reactor with electric field enhancement", 1997. Water Res. vol. 31, No. 3, pp. 675-677.*

T. P. Curtis et al., "Fate of Cryptosporidium oocysts in an immobilized titanium dioxide reactor with electric field enhancement", *Water Research*, vol. 36, No. 9, May 2002, pp. 2410-2413.

(Continued)

*Primary Examiner*—Arun S Phasge
(74) *Attorney, Agent, or Firm*—Buchanan Ingersoll & Rooney PC

(57) ABSTRACT

An electrochemical device including: (a) a semiconductor layer, wherein the semiconductor is silicon or silicon carbide, and where the layer has a thickness from 1 to 1000 μm; (b) a $TiO_2$ layer on the semiconductor layer, where the layer may include an alkaline earth oxide MO up to an amount where the layer is $MtiO_3$, and where the layer has a thickness from 5 nm to 1 mm; (c) a grid of inert metal on the $TiO_2$ layer, arranged so as to be able to apply a electric field across the $TiO_2$ layer; and (d) an ohmic contact on the semiconductor layer.

15 Claims, 1 Drawing Sheet

OTHER PUBLICATIONS

Figure 1:
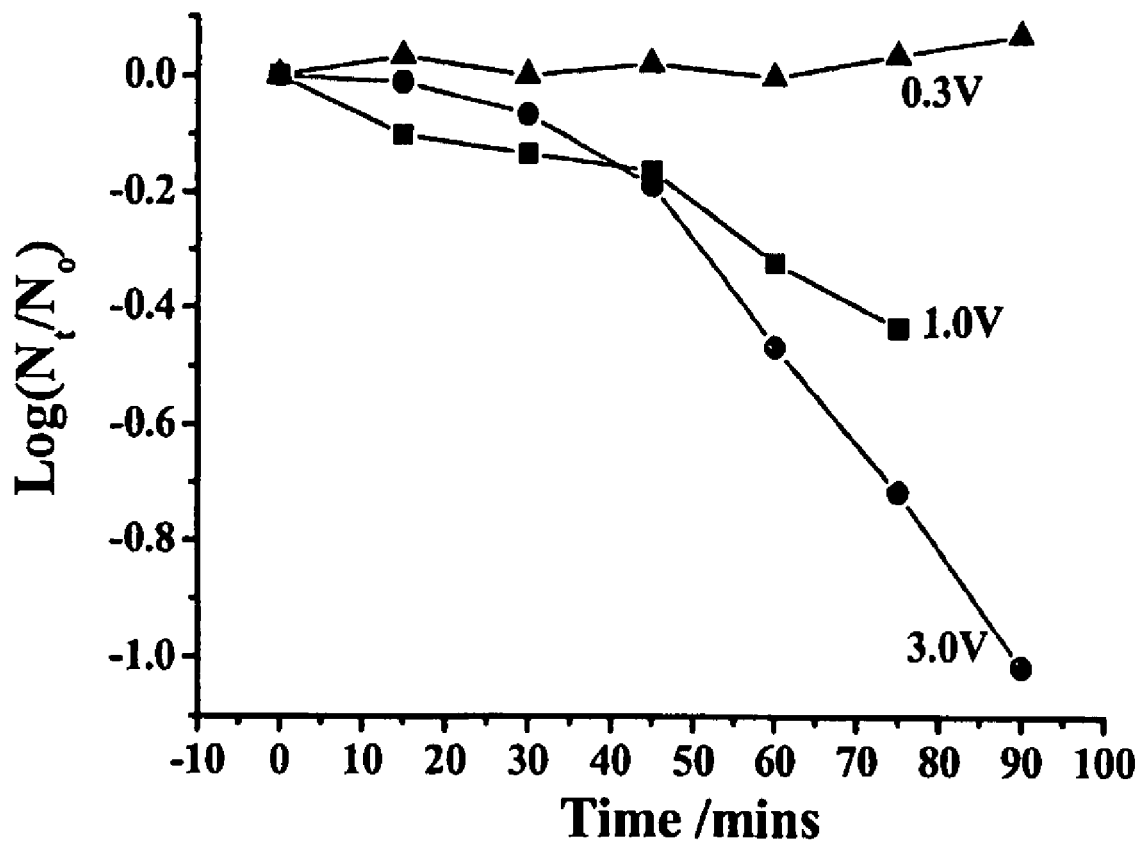

G. Patemarakis et al., "Disinfection of Water by Electrochemical Treatment", *Water Research*, vol. 24, No. 12, Dec. 1990, pp. 1491-1496.

J. Rodriguez et al., "Photo-electrocatalytic degradation of 4-chlorophenol over sputter deposited Ti oxide films", *Thin Solid Films*, 360, 2000, pp. 250-255.

G. R. Torres et al., "Photoelectrochemical Study of Nitrogen-Doped Titanium Dioxide for Water Oxidation", *J. Phys. Chem. B*, vol. 108, No. 19, 2004, pp. 5995-6003.

P. A. Christensen et al., "A novel electrochemical device for the disinfection of fluids by OH radicals", *Chem. Commun.*, 2006, pp. 4022-4023.

* cited by examiner

ELECTROCHEMICAL DEVICE

This application is a National stage filing under 35 U.S.C. §371 of International Application No. PCT/GB2005/003406, filed on Sep. 2, 2005, which in turn claims priority to British Application No. 0419629.1, filed Sep. 3, 2004, the entire contents of which are incorporated herein by reference.

FIELD

The present invention relates to an electrochemical device for generating OH radicals, the use of such a device for the disinfection and/or detoxification of fluids.

BACKGROUND

In the discussion that follows, reference is made to certain structures and/or methods. However, the following references should not be construed as an admission that these structures and/or methods constitute prior art. Applicants expressly reserve the right to demonstrate that such structures and/or methods do not qualify as prior art.

OH radical generation is central to many Advanced Oxidation Processes (AOP's) which are under development for the detoxification of water (*Advanced oxidation Processes for Water and Wastewater Treatment*, Ed. S. Parsons, (IWA Publishing, London, 2004)). The ability of $TiO_2$-based materials to generate OH radicals under UV irradiation has been widely reported, but low photocatalytic efficiencies have limited the technological exploitation of this process.

Although the efficiency of OH generation is increased by the application of an electric field across the $TiO_2$, current densities remain well below 1 mA cm$^{-2}$ even with high power UV lamps (Rodriguez, J., et al., *Thin Solid Films*, 360, 250-255 (2000)).

SUMMARY OF THE INVENTION

The present inventors have discovered that OH radicals can be generated in the absence of light irradiation at the $TiO_2$ surface when this is deposited on a second semiconductor and is overlain with an inert metal grid. The grid is employed to apply an electric field directly across the $TiO_2$ layer. The current passing through this device (thought to be a measure of the rate of OH generation at the $TiO_2$ surface) is significantly higher than that typically observed at conventional, UV-irradiated $TiO_2$ electrodes.

Accordingly, the present invention provides an electrochemical device comprising:

(a) a semiconductor layer, wherein the semiconductor is silicon or silicon carbide, and where the layer has a thickness from 1 to 1000 μm;

(b) a $TiO_2$ layer on the semiconductor layer, where the layer may include an alkaline earth oxide MO up to an amount where the layer is $MTiO_3$, and where the layer has a thickness from 5 nm to 1 μm;

(c) a grid of inert metal on the $TiO_2$ layer, arranged so as to be able to apply a electric field across the $TiO_2$ layer; and (d) an ohmic contact on the semiconductor layer.

BRIEF DESCRIPTION OF THE DRAWING FIGURES

FIG. 1 shows the variation in the amount of *E. coli* in a suspension under treatment by a device of the invention.

DETAILED DESCRIPTION

By applying a field to the device, using the metal grid and the ohmic contact, such that the grid is biased negative with respect to the semiconductor, OH radicals are produced at the surface of the $TiO_2$ layer, when in contact with a fluid (liquid, gas or vapor) containing $H_2O$.

Without wishing to be bound by theory, positive holes from the semiconductor layer travel into the $TiO_2$ layer and are driven to the surface by the electric field. Those holes which are generated directly beneath the grid wires are annihilated when they reach the grid. The holes which are not annihilated react with water to form OH radicals:

$TiO_2(h)+OH^-\rightarrow TiO_2+OH$

Semiconductor Layer

The semiconductor layer may be made of silicon or silicon carbide. Silicon is usually preferred on the grounds of cost, although silicon carbide wafers have the advantage of more favorable band energy alignments with the $TiO_2$ layer. Also, SiC is chemically inert which may be of use in some applications.

The layer has a thickness from 1 to 1000 μm. The lower thickness limit may be 10, 100, 200, 300 or even 500 μm. The upper thickness limit may be 900, 800 or even 600 μm. Silicon wafers often have a thickness in the range of 500 to 600 μm, e.g. 550 μm.

If the wafer is a silicon wafer it may have any suitable crystal orientation, e.g. (100) or (111). The same is the case for a silicon carbide wafer, e.g. (0001).

The ohmic contact on the semiconductor layer may be of any suitable configuration, as well known in the art.

$TiO_2$ Layer

The $TiO_2$ layer is deposited on the semiconductor layer, and may contain alkaline earth oxide (MO), e.g. SrO. The maximum amount of MO is such that the layer is $MTiO_3$, although the amount of MO may be less than 5% on a molar basis relating to the $TiO_2$. In some embodiments, it is preferred that there is no MO present, i.e., the layer is simply $TiO_2$.

The $TiO_2$ layer has a thickness from 5 nm to 1 μm. The upper limit may be 2000, 1500, 1000 or 500 Å. The lower limit may be 100, 200 or 250 Å. A preferred thickness range is 100 to 500 Å.

Metal Grid

The metal grid comprises inert metal. The metal should be inert to the conditions in which the device is to be used. Suitable metals include the noble metals, e.g., gold, platinum.

The grid is preferably arranged so as to be able to apply a uniform electric field across the $TiO_2$ layer. Typically, the space left uncovered by the grid is between 40% and 60% of the surface area overlain by the grid, but may be as low as 30% or as high as 75% of the surface area overlain by the grid. The grid wires may have a thickness of between 1 and 1000 μm, and may be spaced from one another by 1 to 1000 μm, although it is preferred that the spacing is the same order of magnitude as the wire width.

A preferred grid would have wires of between 5 and 10 μm, spaced from one another by 5 to 10 μm.

An adhesion layer may be used between the $TiO_2$ layer and the metal grid, for example, a 5 to 50 Å layer of Ti.

Manufacture

The $TiO_2$ layer may be deposited on the semiconductor layer using any suitable technique known in the art, e.g., sputtering, electron-beam evaporation, thermal evaporation.

A preferred technique is DC Magneton Sputtering (DCMS) which has the advantages of excellent control and experimental flexibility and is an established industrial process suitable for high area, high quality film deposition. Such a process may be used to deposit C-doped or N-doped $TiO_2$ films (see for example Torres, G. R., et al., *J. Phys. Chem. B.* 108, 5995-6003 (2004)).

The deposition is usually preceded by cleaning of the semiconductor, for example, using acetone, isopropyl alcohol and demineralized water, followed by 'RCA' cleaning and de-oxidization, for example by treatment in 6% HE for five minutes.

The deposition takes place in a vacuum chamber and involves the deposition of the desired thickness of Ti, followed by oxidation to yield the $TiO_2$ layer. If the layer also contains MO, then the initial deposition is of both Ti and M, e.g., Sr. Direct deposition of the $TiO_2$ layer by methods known in the art can also be used.

The metal grid is deposited on the $TiO_2$ layer using standard techniques, including photolithography and wet chemical etching.

Operating Conditions

The voltage applied across the $TiO_2$ layer should be sufficient to lower the energy barrier to hole current so that current can flow. Typically, the voltage will be at least 0.5 V, but may be less.

In the example device given below, a current level of 435 mA was reached with a voltage level of 4V between the grid and silicon.

A preferred minimum voltage applied is 0.5, 1V or 2V, and a preferred maximum voltage applied is 9V, 8V or TV.

The device of the present invention does not require light to produce OH radicals, and therefore, it may be preferred that it is operated in the dark. The device may be operated at any appropriate temperature, e.g. 0 to 300° C.

In order for OH radicals to be generated at the surface of the $TiO_2$, the fluid in contact with the surface should have a minimum water content of 0.1% by volume. The fluid may be gaseous, e.g., air or liquid, e.g. water.

The device of the invention has particular applicability to the disinfection of contaminated fluids, e.g., air and water. OH radicals are effective at destroying a very wide range of chemical pollutants and killing bacteria and killing pathogens including *E. coli, Legionella* and *Cryptosporidium*, some of which are resistant to conventional disinfection techniques.

Example

A 25 $cm^2$ 500 μm n-Si (100) (1-10 ohm-cm) wafer was carefully cleaned in trichloroethylene (5 minutes at 80° C.), acetone (5 minutes at 80° C.) and isopropyl alcohol (5 minutes at 80° C.) before rinsing in de-ionized water. The silicon was then further cleaned using a standard RCA procedure ($NH_4OH:H_2O_2:H_2O$ at 80° C. for 5 minutes followed by $HCl:H_2O_2:H_2O$ at 80° C. for 5 minutes). The sample was then deoxidized in 6% HF for 5 minutes immediately prior to being placed in a vacuum chamber. Titanium was then deposited to a thickness of 1200 Å and the sample then placed in a lamp heated furnace for rapid oxidation at approximately 900° C. for 90 seconds. The sample was then returned to the vacuum chamber for deposition of the gold (1000 Å of gold preceded by a thin Ti adhesion layer, 20 Å). The gold grid was then patterned by spinning standard photoresist onto the surface and patterning with UV light exposed through a mask. Following hardbaking of the resist, the gold was etched in aqua regia, to yield a grid having wires which have a thickness of 0.5 mm and being spaced from one another by 1 mm.

In the following test, the gold grid was negative biased with respect to the silicon at varying voltages, and the voltage between the two controlled by a Sycopel AEW2 potentiostat.

The device was immersed in the dark in 100 ml of a suspension of *E. coli* bacteria ($10^8$ cfu $ml^{-1}$) in 1.4 mM $Na_2SO_4$ which was stirred at 350-400 rpm with a magnetic stirrer placed at one side of the cell. This was drawn from a 250 ml suspension, of which the unused portion, 150 ml, was kept in the dark, sampled at 45 and 90 minutes, and used as a control.

The *E. coli* suspension was prepared by growing *E. coli* (NCIMB, 4481) overnight in nutrient broth (Oxoid, UK) containing $10^8$ cfu $ml^{-1}$. This was then washed twice with sterilized ultrapure water—after each washing, it was centrifuged at 3000 rpm for 10 min. before being resuspended.

Enumeration of the *E. coli* was carried out by membrane filtration using 'membrane lauryl sulphate broth' (Oxoid, UK) as described in The Standing Committee of Analysts, "Microbiology of Water 1994, Part 1-Drinking Water" (ISBN 01 17530107, HMSO, London, 1994).

The results are shown in FIG. 1, wherein $N_o$ is the number of *E. coli* per ml at the start of the experiment, and $N_t$ the number t minutes in to the disinfection and clearly demonstrate a potential-dependent kill.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. An electrochemical device comprising:
   (a) a semiconductor layer, wherein the semiconductor is silicon or silicon carbide, and where the layer has a thickness of 1 to 1000 μm;
   (b) a $TiO_2$ layer on the semiconductor layer, and where the layer has a thickness from 5 nm to 1 μm;
   (c) a grid of inert metal on the $TiO_2$ layer, arranged so as to be able to apply an electric field across the $TiO_2$ layer; and
   (d) an ohmic contact on the semiconductor layer.

2. The device of claim 1, wherein the semiconductor layer is silicon.

3. The device of claim 1, wherein the semiconductor layer has a thickness in the range of 500 to 600 μm.

4. The device of claim 1, wherein the alkaline earth oxide is SrO.

5. The device of claim 1, wherein the amount of MO in the $TiO_2$ layer is less than 5% on a molar basis relating to the $TiO_2$.

6. The device according to claim 5, wherein there is no MO present in the $TiO_2$ layer.

7. The device of claim 1, wherein the $TiO_2$ layer has a thickness from 100 to 500 Å.

8. The device of claim 1, wherein the metal grid is made of a noble metals.

9. The device of claim 1, wherein the metal grid is arranged so as to be able to apply a uniform electric field across the $TiO_2$ layer.

10. The device of claim 1, wherein the $TiO_2$ layer comprises an alkaline earth oxide MO in an amount such that the layer comprises $MTiO_3$.

11. A method of generating OH radicals at the surface of the $TiO_2$ layer of a device according to claim 1, comprising: (i) contacting the surface with a fluid containing $H_2O$; (ii) applying an electric field across the device.

12. The method according to claim 11, wherein the voltage applied across the $TiO_2$ layer is sufficient to lower the energy barrier to hole current so that current can flow.

13. The method according to claim 12, wherein the voltage is at least 0.5 V.

14. The method according to claim 11, wherein the OH radicals are used for disinfection or detoxification of a contaminated fluid.

15. The method according to claim 14, wherein the fluid is contaminated with one or more components selected from the group consisting of: chemical pollutants; bacteria; and pathogens.

* * * * *